(12) United States Patent
Cheng et al.

(10) Patent No.: US 8,931,836 B2
(45) Date of Patent: Jan. 13, 2015

(54) CHILD SAFETY SEAT

(75) Inventors: Chin-Ming Cheng, Central (HK); Yu-Ya Su, Central (HK)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 63 days.

(21) Appl. No.: 13/604,637

(22) Filed: Sep. 6, 2012

(65) Prior Publication Data

US 2013/0062919 A1    Mar. 14, 2013

Related U.S. Application Data

(60) Provisional application No. 61/532,106, filed on Sep. 8, 2011.

(51) Int. Cl.
*B60N 2/42* (2006.01)
*B60N 2/48* (2006.01)
*B60N 2/28* (2006.01)

(52) U.S. Cl.
CPC ............ *B60N 2/4885* (2013.01); *B60N 2/2851* (2013.01)
USPC .................. 297/216.11; 297/216.12; 297/408; 297/409

(58) Field of Classification Search
CPC ...... B60N 2/2851; B60N 2/4885; A47C 1/08; A47C 7/36
USPC ................ 297/216.11, 216.12, 391, 408, 409
See application file for complete search history.

(56) References Cited

U.S. PATENT DOCUMENTS

| 3,838,870 | A | 10/1974 | Hug | |
|---|---|---|---|---|
| 6,033,018 | A | 3/2000 | Föhl | |
| 6,250,716 | B1 | 6/2001 | Clough | |
| 7,275,792 | B2 * | 10/2007 | Pos | 297/396 |
| 7,631,935 | B2 * | 12/2009 | Chen et al. | 297/284.9 |
| 2008/0111412 | A1 * | 5/2008 | Woellert et al. | 297/256.1 |

FOREIGN PATENT DOCUMENTS

| CN | 1733525 A | 2/2006 |
|---|---|---|
| CN | 200960864 Y | 10/2007 |
| CN | 101421131 A | 4/2009 |
| DE | 10 2004 046 163 A1 | 2/2006 |
| EP | 1 084 900 A2 | 3/2001 |
| GB | 2 449 371 A | 11/2008 |

* cited by examiner

*Primary Examiner* — David R Dunn
*Assistant Examiner* — Jody Giacoman
(74) *Attorney, Agent, or Firm* — Winston Hsu; Scott Margo

(57) ABSTRACT

A child safety seat includes a seat back and a head rest disposed on the seat back. When a child sits on the child safety seat, his back is against the seat back, and his head is against the head rest. The child safety seat also includes two sliding slot structures, formed on the seat back, and two sliding rods. The two sliding rod are connected to two opposite sides of the head rest corresponding to the two sliding slot structures and slidably disposed in the corresponding sliding slot structures. When the sliding rod is at a first restraining position of the sliding slot structure and the child safety seat shakes because of an impact, the head rest moves relative to the seat back, so that the sliding rod slides to a second restraining position sliding slot structure, which reduces possible harm to the head of the child.

10 Claims, 12 Drawing Sheets

CHILD SAFETY SEAT

CROSS REFERENCE TO RELATED APPLICATIONS

This application claims the benefit of U.S. Provisional Application No. 61/532,106, which was filed on Sep. 8, 2011 and is incorporated herein by reference.

BACKGROUND OF THE INVENTION

1. Field of the Invention

The invention relates to a child safety seat, and especially relates to a child safety seat which head rest is movable.

2. Description of the Prior Art

A head rest of a conventional child safety seat is usually disposed to be with a head pad thereon for a child to lie on. When the child safety seat is under a sudden impact such as a traffic accident, the child will rapidly lean forward and immediately spring backward. It causes the child harm by the impact of the head of the child to the head pad. Especially the further from the head of the child after the forward leaning to the head pad, the more the abovementioned harm. The energy of the impact to the child due to the forward and backward violent movement is almost absorbed by the child, especially by the head, which easily produces harm to the head and neck of the child.

SUMMARY OF THE INVENTION

An objective of the invention is to provide a child safety seat having a movable head rest. When the child safety seat shakes because of an impact, the head rest can move forward to shorten the distance from the head of the child after the forward leaning to the head pad, for reducing the impact energy to the head of the child. The possible harm to the head of the child is therefore reduced.

The child safety seat of the invention has a seating orientation, i.e. toward the front of the child safety seat. The child safety seat includes a seat back and a head rest. The head rest is disposed on the seat back. When a child is seated on the child safety seat, the back of the child is against the seat back, and the head of the child is against the head rest and faces the seating orientation. The child safety seat also includes two sliding slot structures and two sliding rods. The two sliding slot structures are formed on the seat back. The sliding slot structure has a first restraining position and a second restraining position. The two sliding rods are connected to two opposite sides of the head rest corresponding to the two sliding slot structures and slidably disposed in the corresponding sliding slot structures. The sliding rod is capable of being located at the first restraining position or the second restraining position. Therein, when the sliding rod is located at the first restraining position and the child safety seat shakes because of an impact, the head rest moves relative to the seat back toward the seating orientation, i.e. the front of the child safety seat, so that the sliding rod slides from the first restraining position to the second restraining position.

The head rest is relatively farther from the seat back when the sliding rod is located at the second restraining position than when the sliding rod is located at the first restraining position; that is, after the child leans forward because of the impact, the distance from the head of the child after the leaning to the head rest is smaller than that from the head of the child before the leaning to the head rest. Therefore, compared with the disposition of the head rest of the conventional child safety seat, in the structure of the child safety seat of the invention, the distance of the head of the child springing back to the head rest has been shortened. The impact energy to the head of the child is also reduced, so that the possible harm to the head of the child can be reduced or eliminated. Further, the child safety seat of the invention can also include two side protection portions, disposed on two sides of the head rest, for further protecting the head of the child.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
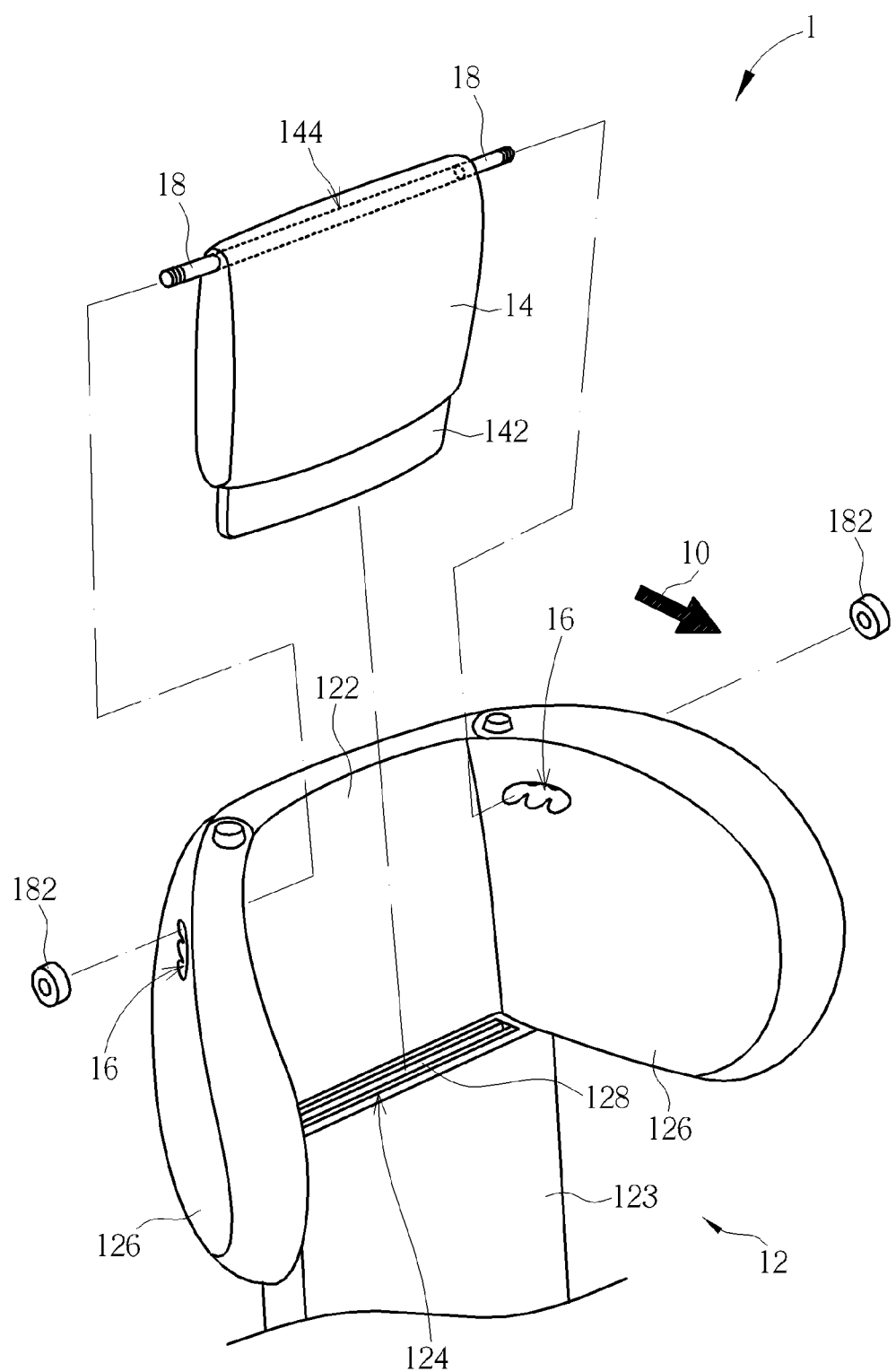
FIG. 1 is a partially-exploded view of a child safety seat of a preferred embodiment according to the invention.
Figure 2:
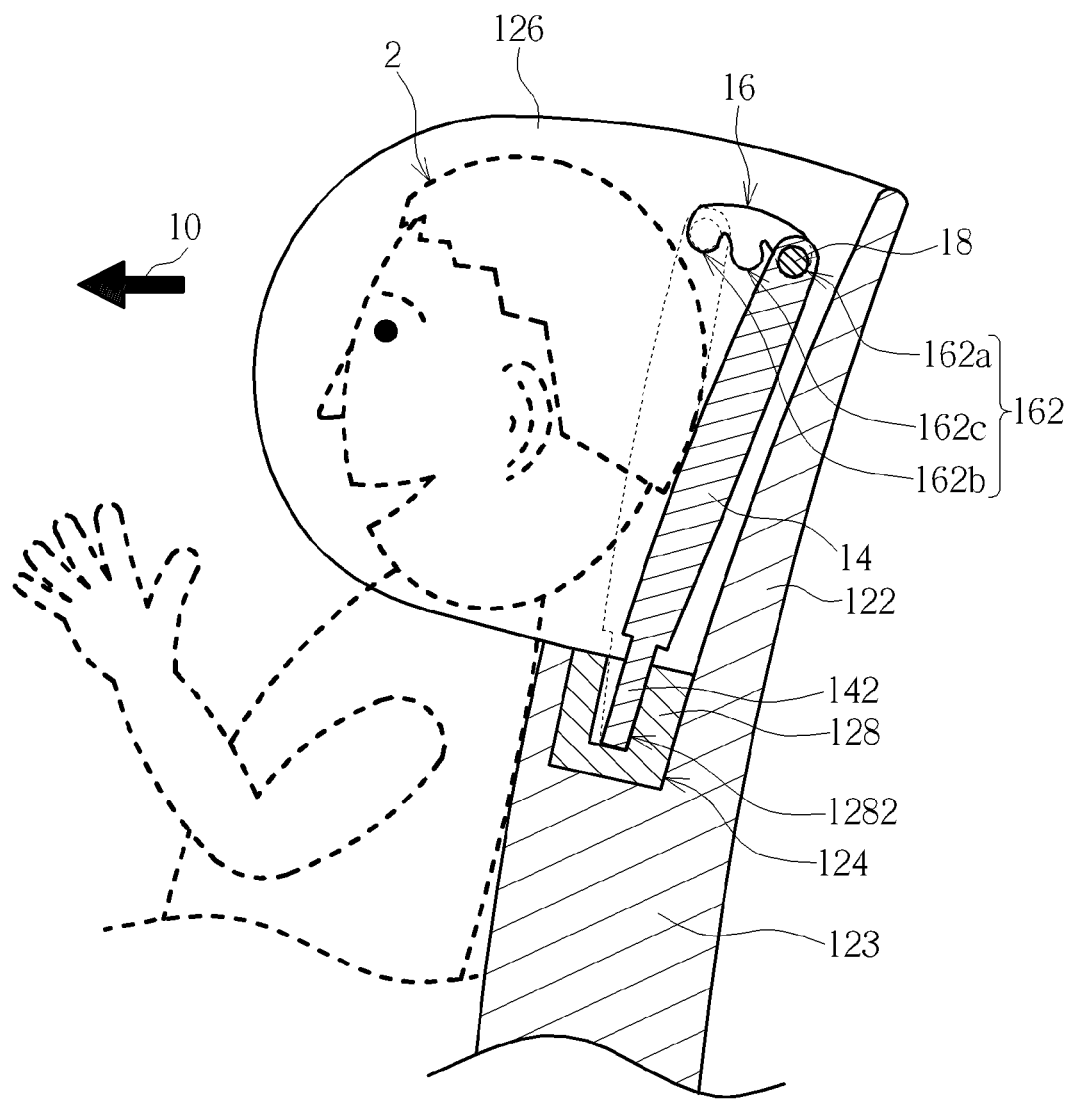
FIG. 2 is a side-viewed sectional schematic diagram illustrating the action of the child safety seat in FIG. 1.
Figure 3:
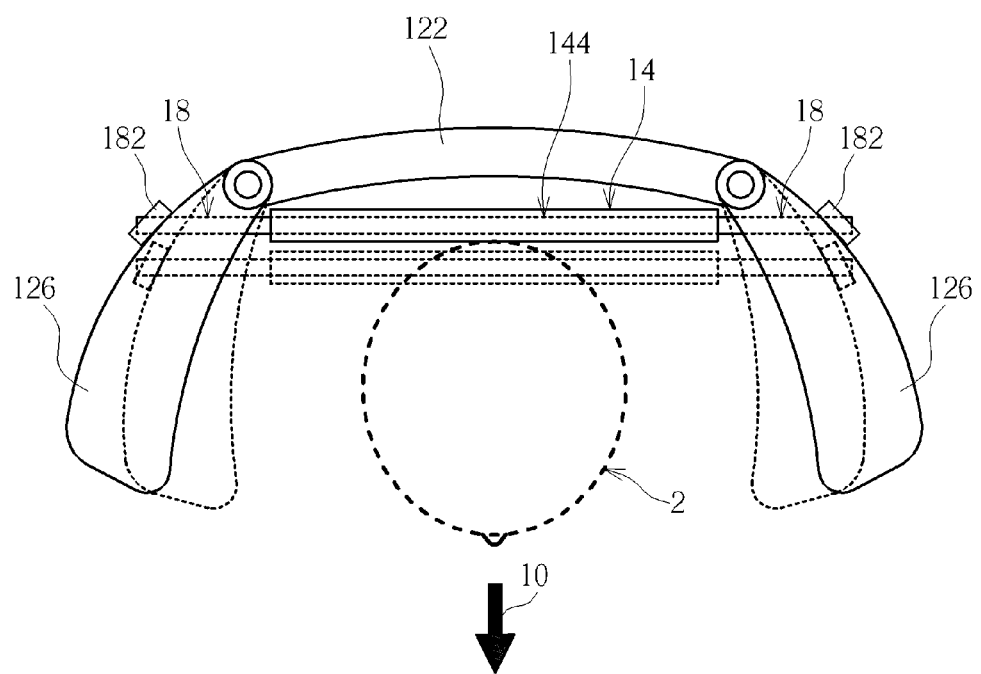
FIG. 3 is a top-viewed schematic diagram illustrating the action of the child safety seat in FIG. 1.

Please refer to FIGS. 1 through 3. FIG. 1 is a partially-exploded view of a child safety seat 1 of a preferred embodiment according to the invention. FIG. 2 is a side-viewed sectional schematic diagram illustrating the action of the child safety seat 1. FIG. 3 is a top-viewed schematic diagram illustrating the action of the child safety seat 1. The child safety seat 1 has a seating orientation 10 and includes a seat back 12, a head rest 14, two sliding slot structures 16, and two sliding rods 18. The seat back includes a head portion 122 and a torso portion 123. The head rest 14 is disposed on the head portion 122 of the seat back 12. When a child 2 (shown by bold lines in FIG. 2) is seated on the child safety seat 1, the back of the child 2 is against the seat back 12, and the head of the child 2 is against the head rest 14 and faces the seating orientation 10, i.e. toward the front of the child safety seat 1. The sliding slot structures 16 are disposed on the seat back 12. The two sliding rods 18 are connected to two opposite sides of the head rest 14 corresponding to the two sliding slot structures 16 and disposed in the corresponding sliding slot structures 16, so that the head rest 14 moves together with the sliding rods 18 relative to the seat back 12 during the sliding rods 18 sliding in the sliding slot structures 16.

Further, in the embodiment, the torso portion 123 of the seat back 12 thereon forms an insertion slot 124. The seat back 12 includes two side protection portion 126 pivotally connected to the head portion 122 oppositely. The head rest 14 has an edge portion 142. The head rest 14 is movably inserted into the insertion slot 124 by the edge portion 142 and disposed between the two side protection portions 126. The two sliding slot structures 16 are formed through the two side protection portions 126 respectively. The sliding rod 18 has a retaining portion 182. The sliding rod 18 passes through the corresponding sliding slot structure 16. The retaining portion 182 is located at an outer side of the corresponding side protection portion 126 opposite to the head rest 14. In the embodiment, the head rest 14 has a through hole 144 formed opposite to the edge portion 142. The two sliding rods 18 is realized by a transverse shaft passing through the through hole 144 and screwed by fastening parts (e.g. nuts) at its two ends. Therein, the two ends of the transverse shaft are taken as the sliding rods 18, the fastening parts as the retaining portions 182; however, the invention is not limited thereto. For example, two individual transverse shafts can be alternatively used to pass through the two sliding slot structures 16 at the two sides of the head rest 14 respectively; similarly, fastening parts are also used to be fastened at the free ends of the individual transverse shafts.

The sliding slot structure 16 has a waved structure 162. The sliding rod 18 can be selectively located at one of troughs of the waved structure 162. In the embodiment, the closest trough to the seat back 12 can be defined as a first restraining position 162a; the farthest trough to the seat back 12 can be defined as a second restraining position 162b. In the embodiment, the edge portion 142 is not fixed in the insertion slot 124 to be immobile totally, so the head rest 14 can rotate relative to the seat back 12 about the insertion slot 124 as a fulcrum. The sliding rods 18 slide in the corresponding sliding slot structures 16 as the headrest 14 rotates. When the sliding rod 18 is located at the first restraining position 162a and the child safety seat 1 shakes because of an impact due to a traffic accident or emergency brake at high speed for example, because of inertia effect, the head rest 14 rotates about the insertion slot 124 as a fulcrum relative to seat back 12 toward the seating orientation 10, so that the sliding rod 18 in the corresponding waved structure 162 slides from the first restraining position 162a to the second restraining position 162b. At this moment, the position of the head rest 14 relative to the seat back 12 has been adjusted. The position of the adjusted head rest 14 is shown by dashed lines in FIG. 2. During the forward movement of the head rest 14, the child 2 also moves forward because of inertia effect. The adjusted head rest 14 is farther from the seat back 12; that is, the head rest 14 at this moment is closer to the head of the child 2 than the head rest 14 before the adjustment. Therefore, when the child 2 springs back, the distance from the head of the child 2 to the head rest 14 is shortened, the energy of the head of the child 2 impacting the head rest 14 is reduced, and the possible harm to the head of the child 2 due to this impacting can be reduced or avoided.

It is added that in the embodiment, the sliding slot structure 16 further includes a third restraining position 162c between the first restraining position 162a and the second restraining position 162b. During the shaking of the child safety seat 1 due to an impact, the actual shaking energy by the child safety seat 1 is not always the same. If the sliding amount produced by inertia effect is insufficient for the sliding rod 18 to slide to the second restraining position 162b, the sliding rod 18 may slide only to the third restraining position 162c, which still has the effect of making the head rest 14 move relative to the seat back 12 toward the seating orientation 10 for shortening the distance from the head of the child 2 to the head rest 14. In this case, the energy of the head of the child 2 impacting the head rest 14 is also reduced. Furthermore, in a practical use, the sliding rod 18 can be at the third restraining position 162c initially for a different disposition of the head rest 14 to the first restraining position 162a, which increases use flexibility of the head rest 14 for the head of the child 2. In such case, when the child safety seat 1 shakes because of an impact, the sliding rod 18 still can slide from the third restraining position 162c to the second restraining position 162b because of inertia effect. The distance form the head of the child 2 to the head rest 14 is also shortened. The energy of the head of the child 2 impacting the head rest 14 is also reduced to a certain extent. In addition, in the embodiment, the opening directions of the troughs of the waved structure 162 of the sliding slot structure 16 are forward for functioning as a ratchet, so that it is relatively easy for the sliding rod 18 to move from the first restraining position 162a to the third restraining position 162c and the second restraining position 162b, or move from the third restraining position 162c to the second restraining position 162b. The design of the waved structure 162 is conducive to the stability of the shortened distance from the head of the child 2 to the head rest 14, that is, to reduce the probability of the sliding rod 18 moving from the second restraining position 162b back to the third restraining position 162c or the first restraining position 162a during the unceasingly shaking of the child safety seat 1. i.e., the direction of movement is obstructed to be reversed.

Furthermore, when the sliding rod 18 slides from the first restraining position 162a to the second restraining position 162b; that is, the head rest 14 moves toward the seating orientation 10 relative to the seat back 12, the retaining portions 182 push the corresponding side protection portions 126 so that the two side protection portions 126 rotate relative to the head portion 122 to approach each other. The rotation thereof is shown as FIG. 3; therein, the head rest 14 and the side protection portions 126 after moved are shown by dashed lines. Further for simplification of the drawing, the sliding slot structures 16 are not shown by hidden lines in FIG. 3. At this moment, the side protection portions 126 are much closer to the head of the child 2, which is conducive to the protection of the head of the child 2 during the child 2 leaning forward and spring backward, such as avoiding the harm to the head, brain and neck of the child 2 due to excessively rotating.

In addition, please refer to FIG. 2. In the embodiment, the seat back 12 includes an elastic cushion 128, disposed in the insertion slot 124. The elastic cushion 128 has a U-shaped cross section to form a groove 1282. The edge portion 142 is inserted into the groove 1282. The elastic cushion 128 exists between the edge portion 142 and the both sidewalls of the insertion slot 124. Because of elasticity of the elastic cushion 128, when the head of the child 2 springs back to impact the head rest 14, the edge portion 142 compresses the elastic cushion 128 to deform the elastic cushion 128 for buffer of the impact force, which is also favorable to reduction or avoidance of the probable harm to the head of the child 2 due to impact.

Figure 4:
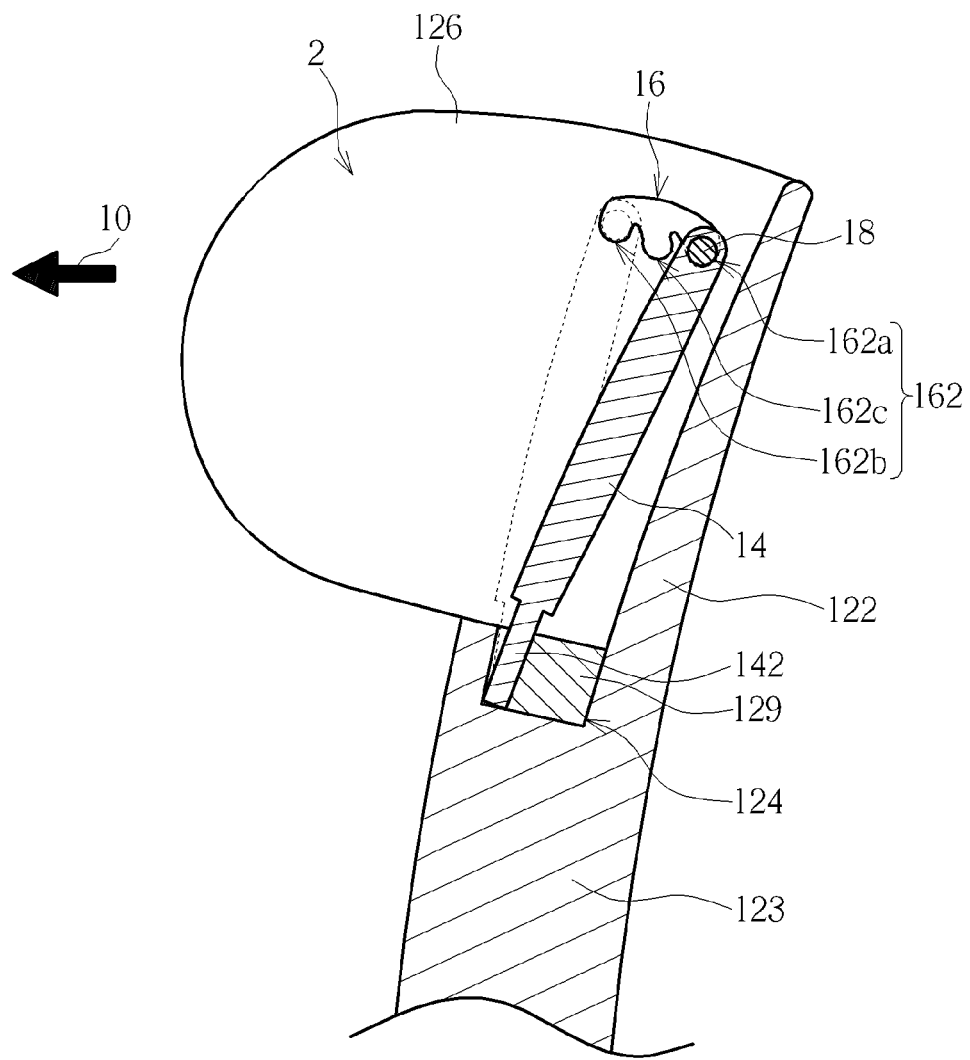
FIG. 4 is a side-viewed sectional schematic diagram illustrating the action of the child safety seat according to another embodiment.

Because the elastic cushion 128 primarily provides the buffer of the impact to the head rest 14 by the head of the child 2, in practice, it is unnecessary for the elastic cushion 128 to cover the edge portion 142 completely. Please refer to FIG. 4, which is a side-viewed sectional schematic diagram illustrating the action of the child safety seat according to another embodiment. As shown in FIG. 4, the U-shaped elastic cushion 128 is replaced with a strip-shaped elastic cushion 129 to be disposed in the insertion slot 124. The elastic cushion 129 is only disposed between the edge portion 142 and one sidewall of the insertion slot 124. Similarly, when the head of the child 2 impacts the head rest 14, the edge portion 142 compresses the elastic cushion 129 to deform the elastic cushion 129 for buffer of the impact force. It is added that for efficient usage of the buffer effect by the elastic deformation of the elastic cushions 128 and 129 in FIG. 2 and FIG. 4, the elastic cushions 128 and 129 are disposed against the edge portion 142, so that once the head rest 14 moves toward the seat back 12, the edge portion 142 can immediately compress the elastic cushions 128 and 129, and the elastic cushions 128 and 129 deform elastically to perform the buffer effect.

Figure 5:
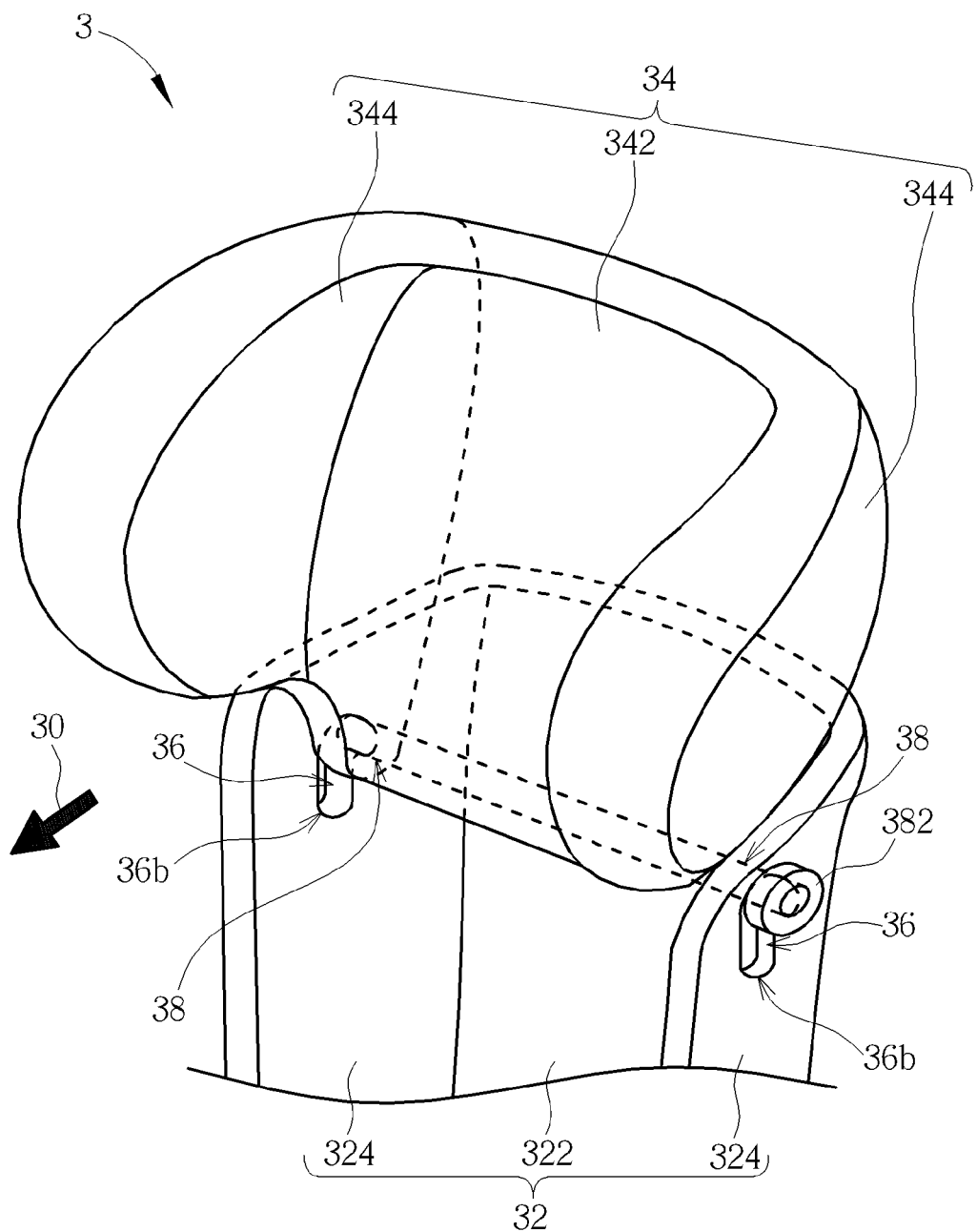
FIG. 5 is a schematic diagram illustrating a child safety seat according to another embodiment before the child safety seat shakes.
Figure 6:
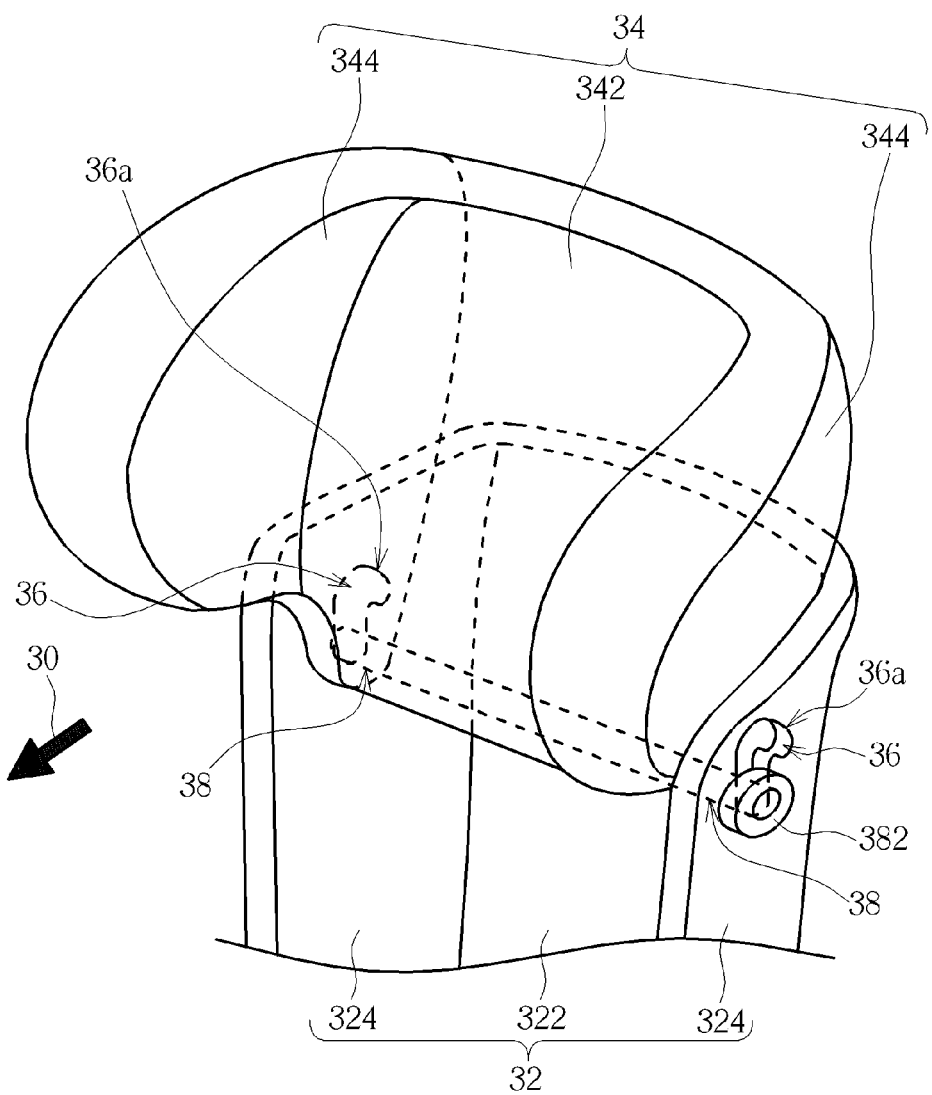
FIG. 6 is a schematic diagram illustrating the child safety seat in FIG. 5 after shaking.

Please refer FIG. 5 and FIG. 6. FIG. 5 is a schematic diagram illustrating a child safety seat 3 according to another embodiment before the child safety seat 3 shakes. FIG. 6 is a schematic diagram illustrating the child safety seat 3 after shaking. Therein, for a better understanding of the whole profile of the child safety seat 3, the hidden profiles of some components are shown in hidden lines. The child safety seat 3 has a seating orientation 30 and includes a seat back 32, a head rest 34, two sliding slot structures 36, and two sliding rods 38. The head rest 34 is disposed on the seat back 32. When a child is seated on the child safety seat 3, the back of the child is against the seat back 32, and the head of the child is against the head rest 34 and faces toward the seating orientation 30, i.e. toward the front of the child safety seat 3. Therein, for simplification of the drawings, the child is not shown in FIG. 5 and FIG. 6. The sliding slot structures 36 are disposed on the seat back 32. The two sliding rods 38 are connected to two opposite sides of the head rest 34 and slidably disposed in the two sliding slot structures 36 correspondingly, so that when the sliding rods 38 slide in the sliding slot structures 36, the head rest 34 is driven to move relative to the seat back 32. The mechanism of child safety seat 3 is substantially the same as the child safety seat 1, using the movement of the sliding rods 18 and 38 in the sliding slot structures 16 and 36 to change the disposition of the head rests 14 and 34 relative to the seat backs 12 and 32 respectively, so as to obtain the effect of the reduction of the distance between the head of the child 2 to the head rests 14 and 34 after the child 2 under the impact leans because of inertia force, for reducing the traveling distance of the head of the child 2. Therefore, the description of the child safety seat 1 which is applicable to the child safety seat 3 is also applied herein and not repeated in addition.

In the embodiment, the seat back 32 includes a main portion 322 and two side wing portions 324 extending from two opposite sides of the main portion 322 respectively. The two sliding slot structures 36 are formed on the two side wing portions 324 correspondingly. The headrest 34 is located between the side wing portions 324 and against the main portion 322. Please refer to FIG. 7, which is a schematic diagram illustrating the disposition of the sliding slot structure 36 and the sliding rod 38; therein, for simple illustration, the sliding slot structure 36 is shown only by its profile, the sliding rod 38 is shown by hatch lines, and the side wing portion 324 and the fastening part 382 of the sliding rod 38 are not shown. The sliding slot structure 36 includes a horizontal short slot section 362 and a vertical long slot section 364 connected to the horizontal short slot section 362. The first restraining position 36a of the sliding slot structure 36 is located at an end of the horizontal short slot section 362. The second restraining position 36b of the sliding slot structure 36 is located at an end of the vertical long slot section 364. When the sliding rod 38 is located at the first restraining position 36a, because the head rest 34 is located at a higher position, the head rest 34 leans against the seat back 32 in a more oblique angle. When the sliding rod 38 is located at the second restraining position 36b, because the head rest 34 is located at a lower position, the head rest 34 leans against the seat back 32 in a more vertical angle. Therefore, the probable harm to the neck of the child due to the head of the child impacting back the head rest 34 can be reduced. Furthermore, the second restraining position 36b is farther from the main portion 32 than the first restraining position 36a, so when the sliding rod 38 is located at the second restraining position 36b, the distance from the head of the child to the head rest 34 is shortened so as to reduce the harm due to the excessive shaking of the head of the child.

In a practical use, when the sliding rod 38 is located at the first restraining position 36a, and the child safety seat 3 shakes because of an impact such as a traffic accident or emergency brake at high speed, because of inertia effect, the head rest 34 moves toward the seating orientation 30 relative to the seat back 32 so that the sliding rod 38 slides from the first restraining position 36a and away from the horizontal short slot section 362 to enter the vertical long slot section 364. Then, because of gravity effect, the head rest 34 moves downward so that the sliding rod 38 in the vertical long slot section 364 can slide to the second restraining position 36b. The movement path of the sliding rod 38 is shown by an arrow in FIG. 7. Therein, before the child safety seat 3 shakes, the disposition of the head rest 34 relative to the seat back 32 is shown by FIG. 5; after the child safety seat 3 shakes, the disposition of the head rest 34 relative to the seat back 32 is shown by FIG. 6. It is added that in the embodiment, the head rest 34 includes a rest portion 342 (i.e. the portion the head of the child lies on directly when the child is seated on the child safety seat 3) and two side protection portions 344 extending toward the seating orientation 30 from two opposite sides of the rest portion 342. The side protection portions 344 can directly provide protection to the head of the child. Further, the side protection portions 344 are located between the side wing portions 324. When the head rest 34 slides downward, i.e. to the second restraining position 36b, the side wing portions 324 and the side protection portions 344 partially overlap. The side protection portions 344 can be structurally supported by the side wing portions 324, improving the structural strength of the side protection portions 344 to the head of the child to a certain extent.

Figure 8:
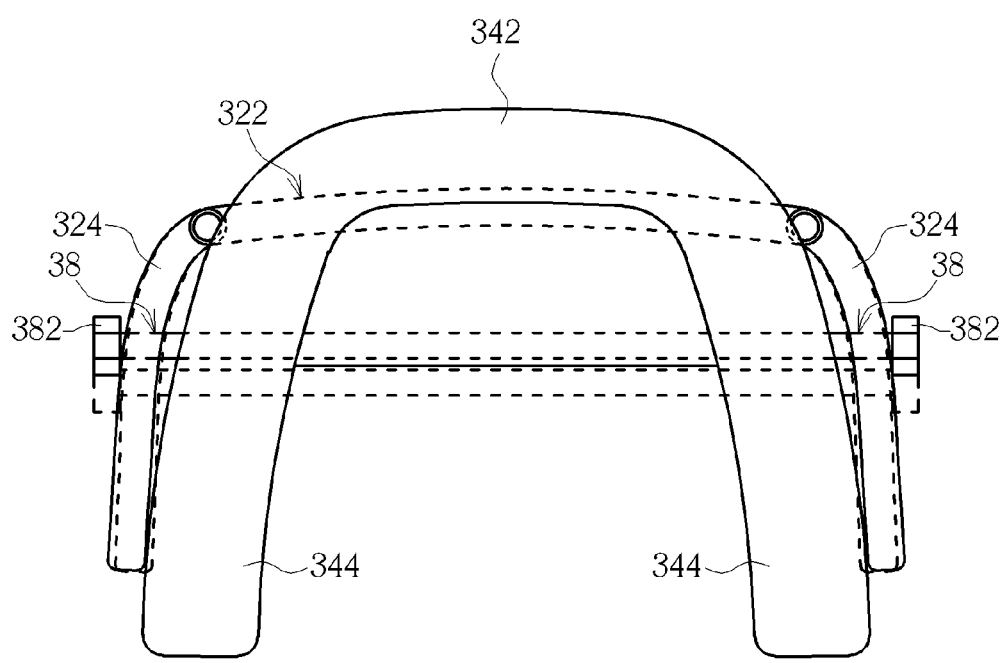
FIG. 8 is a top view of the child safety seat in FIG. 5.

Preferably, the side wing portions 324 can be designed to be pivotally connected to the main portion 322. Similar to the pivotal connection structure of the side protection portions 126 with the head portion 122 in the previous embodiment, the fastening parts 382 can be regarded as the retaining portions 182 of the sliding rods 18, so as to prevent the sliding rods 38 from sliding away from the sliding slot structures 36 and also drive the side wing portions 324 to rotate when the sliding rods 38 slide in the sliding slot structures 36. Please also refer to FIG. 8. FIG. 8 is a top view of the child safety seat 3 in FIG. 5. When shaking occurs, during the sliding of the sliding rod 38 to the second restraining position 36b, the fastening parts 382 push the side wing portions 324 to rotate relative to the main portion 322 to approach each other for protection of the body of the child. Therein, for simplification of the drawing, in the above sliding of the sliding rods 38, FIG. 8 shows the action only of the side wing portions 324 and the sliding rods 38 are shown, which is similar the fact in the previous embodiment that the retaining portions 182 of the child safety seat 1 push the side protection portions 126 to rotate relative to the head portion 122 to approach each other for protection of the head of the child. Furthermore, in the embodiment, the side protection portions 344 are located between the side wing portions 324, so when the side wing portions 324 rotate to approach each other, the side wing portions 324 also further constrain the side protection portions 344. If the side protection portions 344 are elastic or pivoted relative to the rest portion 342, the side protection portions 344 can also approach each other for protection of the head of the child.

Figure 7:
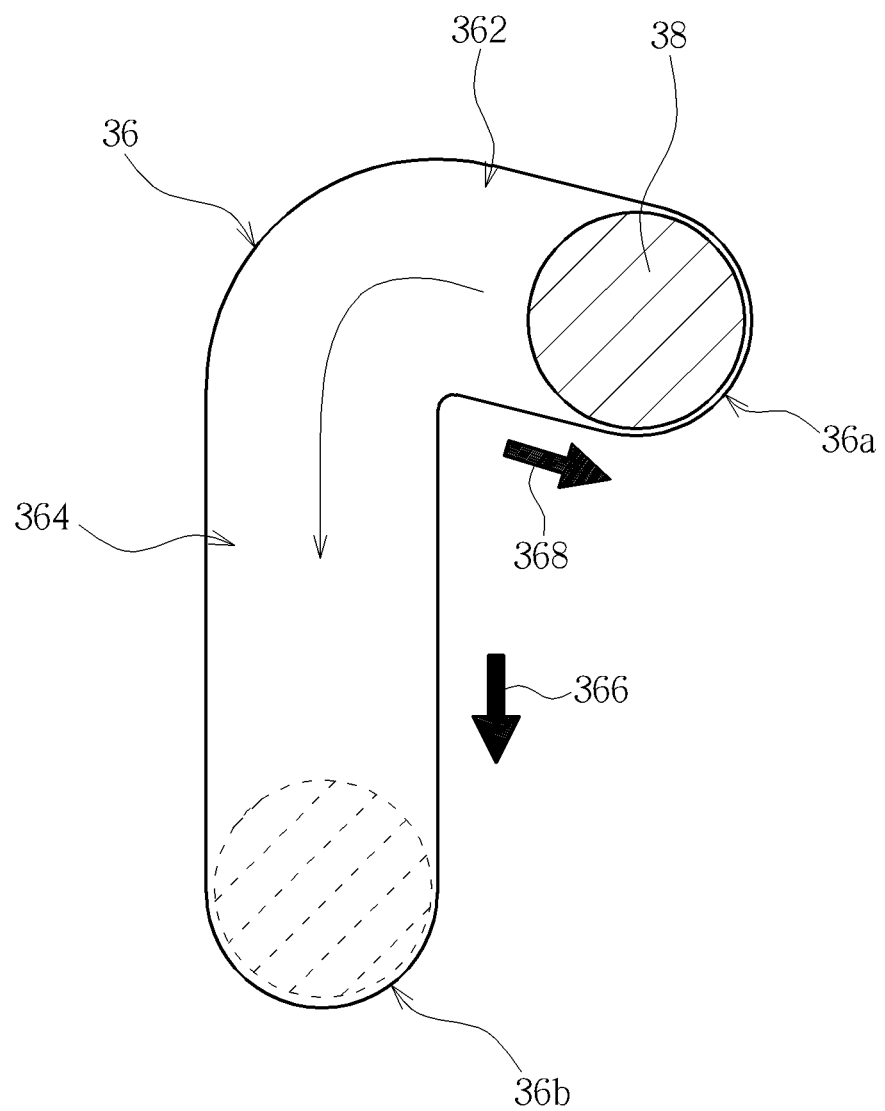
FIG. 7 is a schematic diagram illustrating the disposition of the sliding slot structure and the sliding rod according to another embodiment.

In practice, before the child safety seat 3 shakes, the sliding rod 38 needs to stably stay at the first restraining position 36a, which can be realized by a proper structure. In the embodiment, as shown in FIG. 7, the vertical long slot section 364 extends substantially in a vertical direction 366. The horizontal short slot section 362 extends in a direction 368 with a downward deflection to the vertical direction 366. Therefore, the portion where the horizontal short slot section 362 and the vertical long slot section 364 are connected forms a bent structure; the extension directions (i.e. the directions 366 and 368) of the horizontal short slot section 362 and the vertical long slot section 364 form an acute angle. When the sliding rod 38 is located at the first restraining position 36a, an upward impulsive force is required for the sliding rod 38 to slide away from the horizontal short slot section 362 to enter the vertical long slot section 364. Therefore, when the sliding rod 38 is located at the first restraining position 36a, the sliding rod 38 can be kept staying at the first restraining position 36a by the weight of the head rest 34. It is added that the above-mentioned vertical direction 366 is unnecessary to be totally parallel to the gravity direction. In principle, it is sufficient as long as the sliding rod 38 is capable of tending to move toward the end (i.e. the second restraining position 36b) of the vertical long slot section 364 because of gravity effect after entering the vertical long slot section 364. In addition, in the embodiment, the sliding rod 38 is kept staying at the first restraining position 36a by the weight of the head rest 34, so the direction 368 is properly to be an direction deflecting slightly from a horizontal direction toward the vertical long slot section 364.

Figure 9:
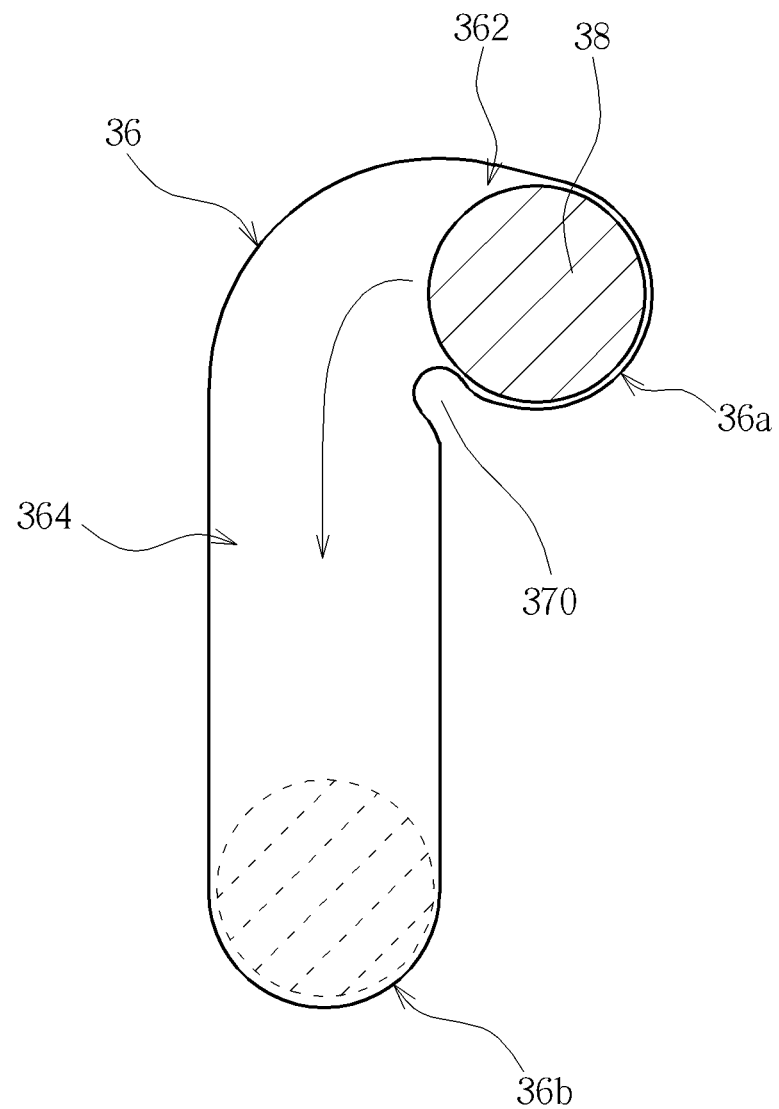
FIG. 9 is a schematic diagram illustrating the disposition of the sliding slot structure and the sliding rod according to another embodiment.

In the above embodiment, the position of the sliding rod 38 can be stabilized by the movement path thereof in coordination with the gravity tendency, but the invention is not limited thereto. In the following description, several embodiments will be illustrated by several position stabilization mechanisms; however, the invention is still not limited thereto. In practice, if no structural interference occurs, the structures of the several embodiments can be structurally integrated. Please refer to FIG. 9, which is a schematic diagram illustrating the disposition of the sliding slot structure 36 and the sliding rod 38 according to another embodiment. The description for FIG. 9 which is the same as for FIG. 7 will not be repeated herein. As shown in FIG. 9, the sliding slot structure 36 includes a retaining member. The retaining member is a retaining portion 370 protruding inward at the place where the horizontal short slot section 362 and the vertical long slot section 364 are connected, which has an effect of necking. Therefore, when the sliding rod 38 moves from the horizontal short slot section 362 toward the vertical long slot section 364, the retaining portion 370 can push against the sliding rod 38 so that before the child safety seat 3 shakes, the sliding rod 38 can still stay in the horizontal short slot section 362. By properly designing the length of the horizontal short slot section 362, the sliding rod 38 can further be kept staying at the first restraining position 36a, as shown in FIG. 9. It is added that when the child safety seat 3 shakes, the sliding rod 38 can overcome the constraining force by the retaining portion 370 to the sliding rod 38, so as to enter the vertical long slot section 364. It can be achieved by designing the structural size of the retaining portion 370, which is obtained by simple experiments by a skilled person in the art and is not described herein.

Figure 10:
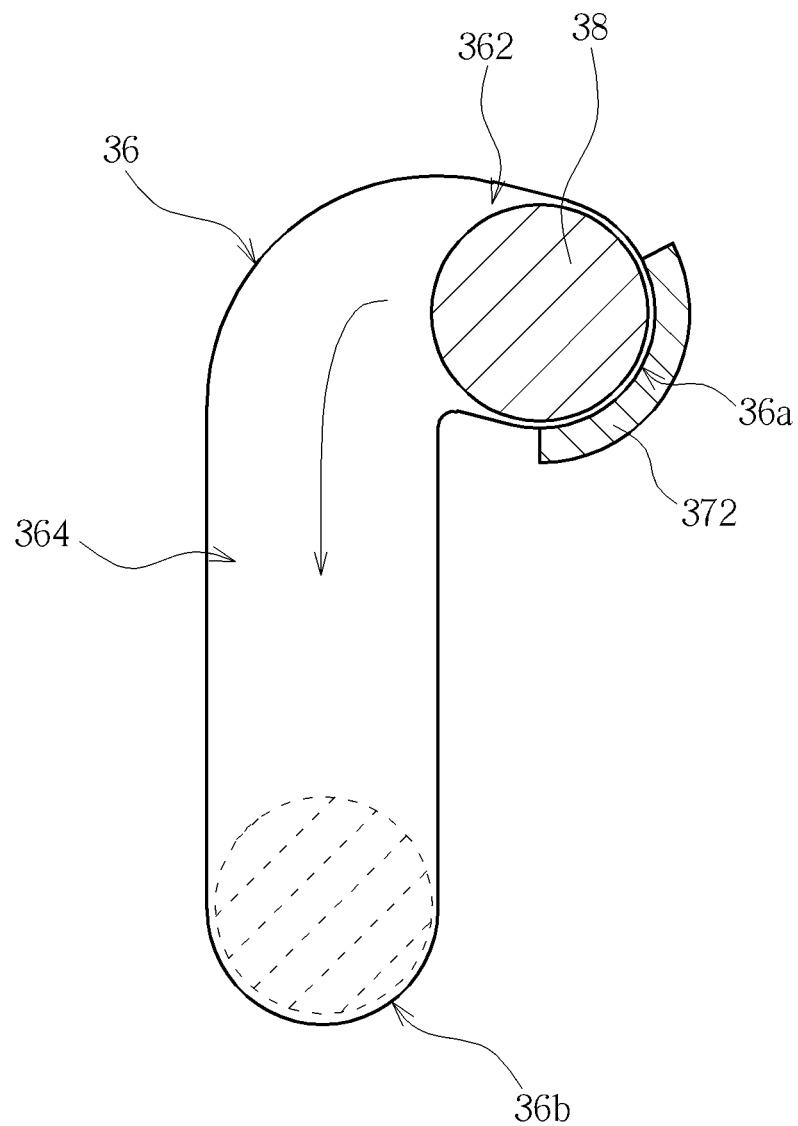
FIG. 10 is a schematic diagram illustrating the disposition of the sliding slot structure and the sliding rod according to another embodiment.

Please refer to FIG. 10, which is a schematic diagram illustrating the disposition of the sliding slot structure 36 and the sliding rod 38 according to another embodiment. The description for FIG. 10 which is the same as for FIG. 7 will not be repeated herein. As shown in FIG. 10, the sliding slot structure 36 includes a retaining member. The retaining member is a magnetic portion 372 such as magnet disposed at the end of the horizontal short slot section 362. Therefore, when the sliding rod 38 is located at the first restraining position 36a, the magnetic portion 372 magnetically attracts the sliding rod 38, so that the sliding rod 38 can stably stay at the first restraining position 36a. In the embodiment, the sliding rod 38 can be directly made of a ferruginous rod. It is added that when the child safety seat 3 shakes, the sliding rod 38 still can overcome the magnetic attraction by the magnetic portion 372 to the sliding rod 38, so as to enter the vertical long slot section 364. It can be achieved by designing the magnetic attraction force of the magnetic portion 372 to the sliding rod 38, which is obtained by simple experiments by a skilled person in the art and is not described herein.

Figure 11:
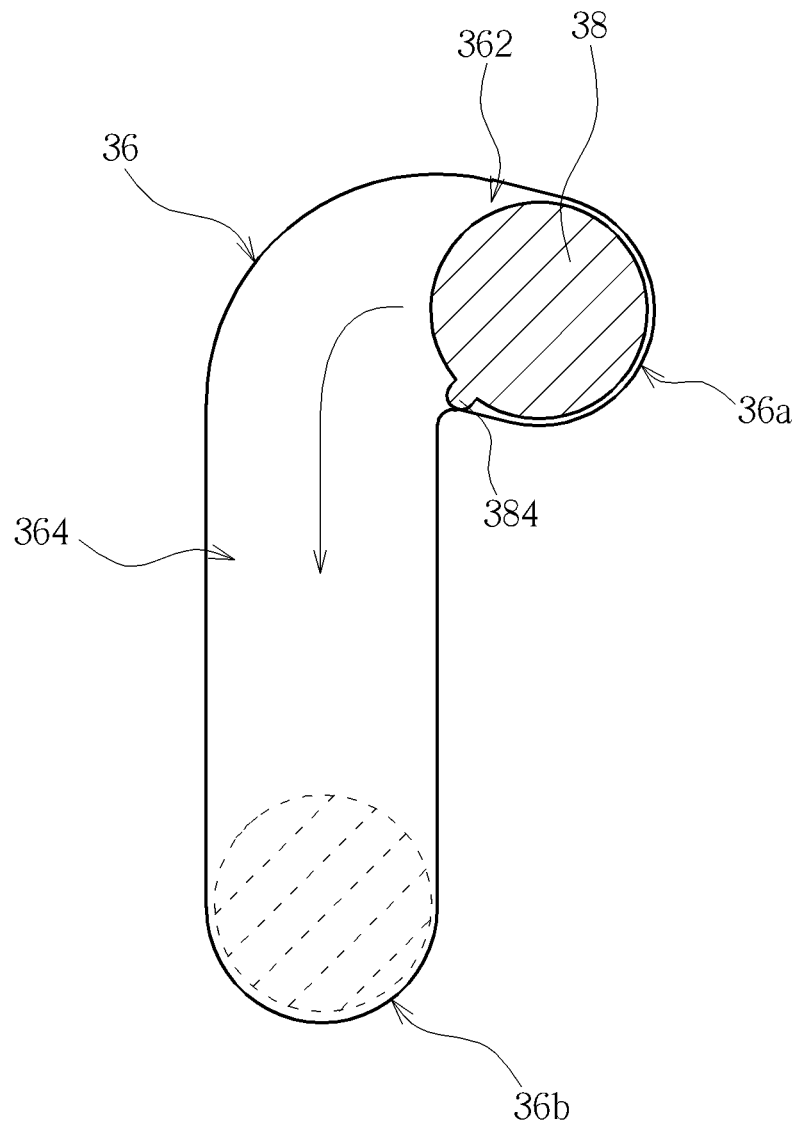
FIG. 11 is a schematic diagram illustrating the disposition of the sliding slot structure and the sliding rod according to another embodiment.

Please refer to FIG. 11, which is a schematic diagram illustrating the disposition of the sliding slot structure 36 and the sliding rod 38 according to another embodiment. The description for FIG. 11 which is the same as for FIG. 7 will not be repeated herein. As shown in FIG. 11, the sliding rod 38 includes a protrusion 384, protruding out its shaft surface. When the sliding rod 38 is located in the horizontal short slot section 362, the protrusion 384 can push against a sidewall of the horizontal short slot section 362, so that the sliding rod 38 can be kept staying in the horizontal short slot section 362. By properly designing the length of the horizontal short slot section 362, the sliding rod 38 can further be kept staying at the first restraining position 36a, as shown in FIG. 11. It is added that when the child safety seat 3 shakes, the sliding rod 38 can overcome the structural constraining force by the protrusion 384 interacting with the horizontal short slot section 362 so as to enter the vertical long slot section 364. It can be achieved by designing the structural size of the protrusion 384, which is obtained by simple experiments by a skilled person in the art and is not described herein.

Figure 12:
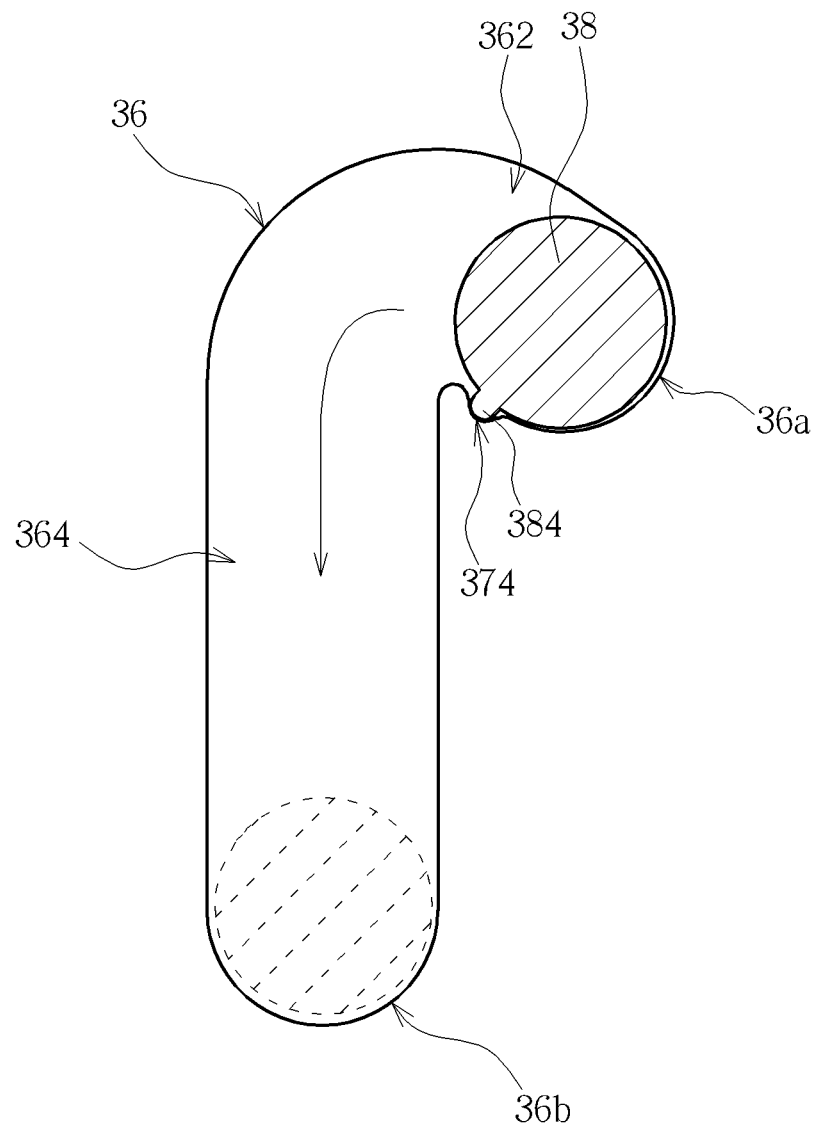
FIG. 12 is a schematic diagram illustrating the disposition of the sliding slot structure and the sliding rod according to another embodiment.

Preferably, the horizontal short slot section 362 thereon can form a structure capable of engaging with the protrusion 384 for enhancing the constraint of the horizontal short slot section 362 to the sliding rod 38. Please refer to FIG. 12, which is a schematic diagram illustrating the disposition of the sliding slot structure 36 and the sliding rod 38 according to another embodiment. The structure shown in FIG. 12 is similar in structure to that shown in FIG. 11. The main difference is that in FIG. 12, the horizontal short slot section 362 further includes a recess 374. When the sliding rod 38 is located in the horizontal short slot section 362, the protrusion 384 is capable of being engaged in the recess 374, so that the horizontal short slot section 362 can perform a larger structural constraint to the sliding rod 38. The sliding rod 38 can stay more stably in the horizontal short slot section 362 or at the first restraining position 36a. Other description thereof can refer to the description about the structure shown in FIG. 11 and will not be described herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat, having a seating orientation, the child safety seat comprising:
   a seat back comprising:
      a head portion;
      a torso portion;
      an insertion slot formed on the torso portion; and
      two side protection portions pivotally connected to the head portion oppositely;
   a head rest disposed on the seat back and located between the side protection portions, when a child is seated on the child safety seat, a back of the child being against the seat back, a head of the child being against the head rest and facing toward the seating orientation, the head rest having an edge portion movably inserted into the insertion slot;
   two sliding slot structures formed through the two side protection portions respectively, the sliding slot structure has a first restraining position and a second restraining position; and
   two sliding rods connected to two opposite sides of the head rest corresponding to the two sliding slot structures and slidably disposed in the corresponding sliding slot structures, each sliding rod having a retaining portion, passing through the corresponding sliding slot structure, and being capable of being located at the first restraining position or the second restraining position, wherein when the sliding rod is located at the first restraining position and the child safety seat shakes because of an impact, the head rest rotates relative to the seat back toward the seating orientation, so that the sliding rod slides from the first restraining position to the second restraining position, and the retaining portion is located at an outer side of the corresponding side protection portion opposite to the head rest, so that when the sliding rod slides from the first restraining position to the second restraining position, the retaining portion pushes the corresponding side protection portion so that the two side protection portions rotate relative to the head portion.

2. The child safety seat of claim 1, wherein the seat back comprises an elastic cushion, disposed in the insertion slot and located between the edge portion and a sidewall of the insertion slot, so that when the head of the child impacts the head rest, the edge portion compresses the elastic cushion.

3. The child safety seat of claim 1, wherein the seat back comprises an elastic cushion, the elastic cushion has a groove, and the edge portion is inserted into the groove.

4. The child safety seat of claim 1, wherein the sliding slot structure has a waved structure, and the first restraining position and the second restraining position are located at troughs of the waved structure.

5. A child safety seat, having a seating orientation, the child safety seat comprising:
   a seat back comprising an insertion slot and an elastic cushion, the elastic cushion has a groove;
   a head rest disposed on the seat back, when a child is seated on the child safety seat, a back of the child being against the seat back, a head of the child being against the head rest and facing toward the seating orientation, the head rest having an edge portion movably inserted into the groove and the insertion slot;
   two sliding slot structures formed on the seat back, the sliding slot structure has a first restraining position and a second restraining position; and
   two sliding rods connected to two opposite sides of the head rest corresponding to the two sliding slot structures and slidably disposed in the corresponding sliding slot structures, the sliding rod being capable of being located at the first restraining position or the second restraining position, wherein when the sliding rod is located at the first restraining position and the child safety seat shakes because of an impact, the head rest rotates relative to the seat back toward the seating orientation, and the sliding rod slides from the first restraining position to the second restraining position, wherein when the head of the child impacts the head rest, the edge portion compresses the elastic cushion against a sidewall of the insertion slot.

6. The child safety seat of claim 5, wherein the elastic cushion is disposed in the insertion slot and located between the edge portion and the sidewall of the insertion slot.

7. The child safety seat of claim 5, wherein the elastic cushion has a groove and the edge portion is inserted into the groove.

8. The child safety seat of claim 5, wherein the seat back comprises a head portion, a torso portion, and two side protection portions pivotally connected to the head portion oppositely, the insertion slot is formed on the torso portion, the two sliding slot structure are formed through the two side protection portions respectively, and the head rest is located between the side protection portions.

9. The child safety seat of claim 8, wherein the sliding rod has a retaining portion, the sliding rod passes through the corresponding sliding slot structure, and the retaining portion is located at an outer side of the corresponding side protection portion opposite to the head rest, so that when the sliding rod slides from the first restraining position to the second restraining position, the retaining portion pushes the corresponding side protection portion so that the two side protection portions rotate relative to the head portion.

10. The child safety seat of claim 5, wherein the sliding slot structure has a waved structure, and the first restraining position and the second restraining position are located at troughs of the waved structure.

* * * * *